United States Patent [19]

Bishop

[11] Patent Number: 4,672,379
[45] Date of Patent: Jun. 9, 1987

[54] DOPPLER RADAR TRANSCEIVER

[76] Inventor: Frank W. Bishop, 4 Frederick Drive, Ringwood, Victoria, 3134, Australia

[21] Appl. No.: 804,392

[22] Filed: Dec. 4, 1985

[51] Int. Cl.$^4$ .............................................. G01S 13/50
[52] U.S. Cl. ...................................... 342/28; 331/58; 455/85
[58] Field of Search .............. 343/5 R, 5 PD; 331/59, 331/117 D, 58; 455/80, 84, 85; 342/27, 28

[56] References Cited

U.S. PATENT DOCUMENTS

| | | | |
|---|---|---|---|
| 2,760,000 | 8/1956 | Beukema et al. | 455/84 X |
| 3,038,068 | 6/1962 | MacDowell et al. | 455/84 |
| 3,136,951 | 6/1964 | Taylor, Jr. | 331/58 X |
| 3,193,777 | 7/1965 | Carter et al. | 331/59 |
| 3,855,550 | 12/1974 | Carlson | 331/117 D X |
| 4,042,934 | 8/1977 | Davis | 343/5 PD X |
| 4,157,549 | 6/1979 | Davis | 343/5 PD X |
| 4,259,743 | 3/1981 | Kaneko et al. | 455/81 |

FOREIGN PATENT DOCUMENTS 2424278 12/1974 Fed. Rep. of Germany ... 343/5 PD

OTHER PUBLICATIONS

G. Hodowanec, "High-Power Transistor M/W OSC.S", (MW Journal, 10/72i pp. 47-66).
G. Hodowanec, "MW Transistor Oscillators", (MW Journal, 6/74; pp. 39-62).
Webster's New Collegiate Dictionary, p. 1099, (1984).

Primary Examiner—T. H. Tubbesing
Assistant Examiner—Bernarr Earl Gregory
Attorney, Agent, or Firm—Dennison, Meserole, Pollack & Scheiner

[57] ABSTRACT

A doppler radar transceiver comprising a transceiving module including a reflex circuit having a single transistor which simultaneously acts as both an oscillator and an amplifier. A capacitor and a resistor are provided in the transistor base element bias circuit to reduce the source impedance of the base bias current to said transistor in the doppler signal frequency band without effecting the radar frequency system of the transceiver.

4 Claims, 1 Drawing Figure

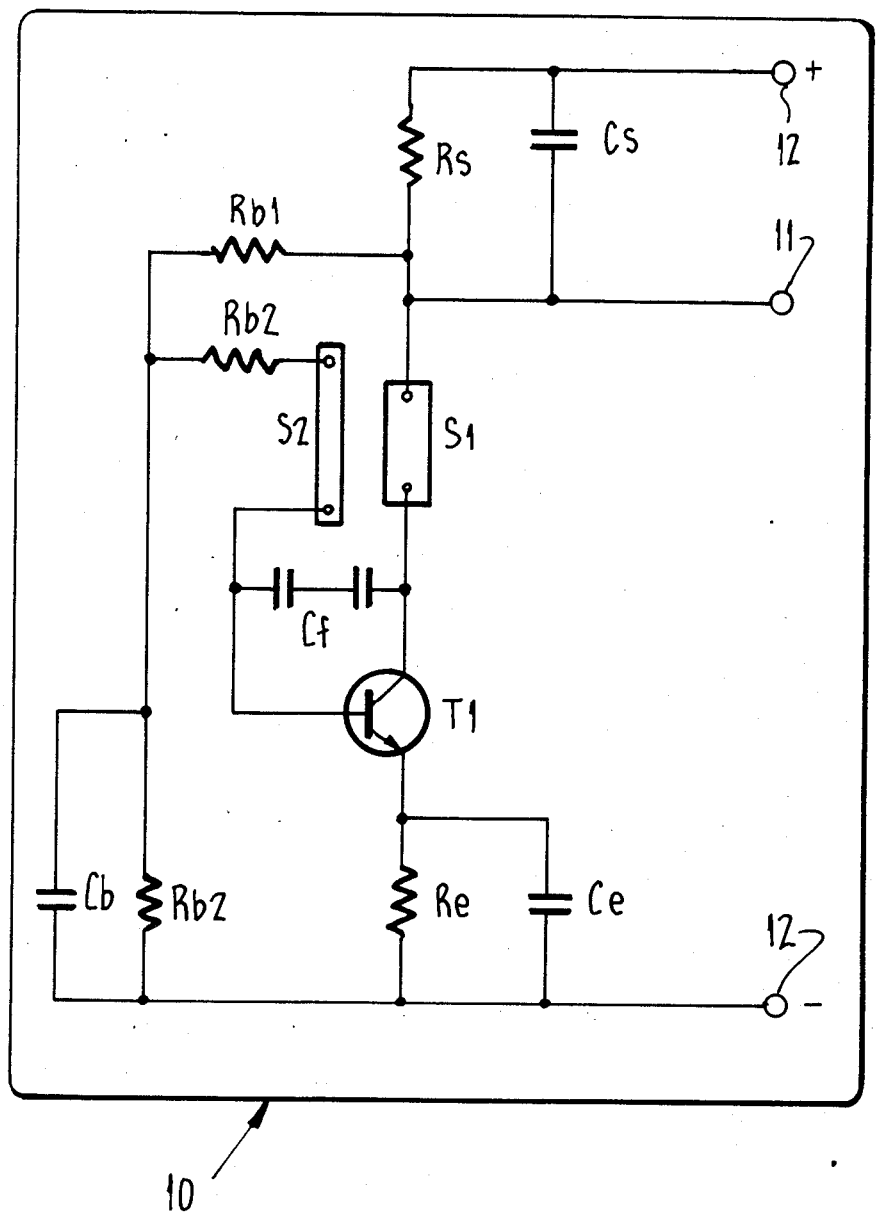

DOPPLER RADAR TRANSCEIVER

This invention relates to a radar transceiver and more particularly to a doppler radar transceiver of the kind used as a movement detector to detect, for example, movement of humans in various situations such as intrusion detection systems, automatic door opening systems and the like. Of course the transceiver may be used to detect movement in many other situations such as movement of shafts, blades and cranks in machines and relative velocities and distances of objects.

A transceiver of the aforementioned kind is described in applicant's pending Australian patent application No. 91099/82 entitled "Doppler Radar Transceiver". The transceiver described in the earlier patent application provides an improvement over previously known radar transceivers of the "antenna loaded" type which have a separate transmitter and receiver circuit. However, the sensitivity and the doppler output signal of applicant's earlier device are not considered sufficient for some installations and accordingly, it is an object of this invention to provide an improved radar transceiver providing greater sensitivity and increased doppler output signal without increasing the radiated radio frequency power of the device.

Thus the invention provides a doppler radar transceiver comprising a transceiving module including a reflex circuit having a single transistor which simultaneously acts as both an oscillator and an amplifier, characterized in that, a capacitor and a resistor are provided in the transistor base element bias circuit to reduce the source impedance of the base bias current to said transistor in the doppler signal frequency band without affecting the radar frequency system of the transceiver.

The effect of the invention is to allow the transistor to act in a third mode as a doppler frequency amplifier in addition to acting as an oscillator, and an amplifier for the received signal. Thus the amplitude of the output signal from the transceiver is increased.

In order that the invention may be more readily understood a particular embodiment will now be described with reference to the accompanying drawing which shows a circuit diagram of a transceiver according to the invention.

The doppler radar transceiver module 10 continuously emits electromagnetic radiation at a frequency of approximately 2500 MHz (wavelength $\lambda = 12$ cm). Radiation occurs from the resonant stripline element S1 and is almost omnidirectional about the plane normal to it. A stable standing wave pattern is set up in the volume surrounding the module and the output from the signal terminal 11 relative to the supply terminals 12 is a pure DC voltage. When an object enters the volume the resultant reflected signal to the module changes. This reflected signal is received by element S2 and amplified, mixed and detected causing the magnitude of the DC voltage at the signal terminal 11 to vary at a rate principally governed by the velocity component of the object normal to the module according to the formula $fD = (2V/\lambda)$ where fD is the frequency of variation of the voltage at the signal terminal V is the velocity component of the object normal to the module $\lambda$ is the wavelength of the radiated signal.

Thus the module operates as a movement detector for a variety targets e.g. humans, animals, shafts, blades, cranks, etc.

The omnidirectional nature of the radiation can be altered simply by providing a reflector or waveguide and horn (not shown) with a resultant gain in effective range.

The doppler radar transceiving module 10 is set up as a reflex circuit wherein the transistor T1 acts as an oscillator, an amplifier for the received signal and a doppler frequency amplifier, simultaneously.

The DC biassing circuit for the transistor is set up such that the base bias current is derived from the voltage divider resistors Rb1 and Rb2 via resistor Rb3 and the stripline component S2. A capacitor Cb is connected across the resistor Rb2 and a further resistor Rb3 is connected in series with the stripline component S2. The value of Cb is selected such that its capacitive reactance at the minimum required doppler frequency is less than one tenth the value of Rb2. The capacitor Cb configures the transistor T1 as a pseudo "grounded base amplifier" such that the voltage variations in the transistor emitter resistor Re act as the signal source for this amplifier and are thus amplified and appear in the transistor collector circuit and in RS. This amplification is restricted to the doppler frequency range and does not affect the radar frequency operation of the circuit as the original high frequency decoupling is maintained by the resistor Rb3. The collector current of T1 is sourced via resonant stripline element S1. The emitter is returned to the other supply rail via the resistors RE.

The AC circuit for the oscillator is as follows. The collector circuit is tuned by the resonant stripline element S1. The emitter resistor RE is bypassed by the capacitor CE. The feedback components necessary to establish the conditions for continuous oscillation are connected from the collector to the base element by means of capacitors cf. The size and shape of S1 determines the frequency of oscillation. The AC circuit for the reflex receiver is basically the same as for the oscillator with the following exceptions:

1. The element S2 is arranged as a quarter wave dipole which is terminated to the base of the transistor and the two resistors Rb1 and Rb2 which represent highly inductive (at this frequency) termination resulting in an open end dipole feeding the base of the amplifier.
2. The resistor RS is bypassed by a large ceramic capacitor CS which is effectively a short circuit to the AC component in this portion of the collector resistor.

PRINCIPLE OF OPERATION

The oscillator commences immediately on application of DC supply to the module and radiates continuously from element S1.

The signal reflected to the module is received in the element S2 and varies the base current to the transistor T1 as a result of the current induced in it, this variation is amplified and inverted by T1 and appears in its tuned collector circuit. Depending on the phase of the resultant received signal the amplified signal either enhances or opposes the oscillator signal causing the oscillator to demand more or less current to operate.

This current is reflected in RS and since this component is AC bypassing the voltage across RS varies according to the phase and amplitude of the received signal.

The resultant effect is that as an object moves through the radiated field and causes reflections of varying phase relative to that radiated by the oscillator then the current through RS and the voltage across it varies proportionally according to the above formula.

According to a modification, the supply to the transceiver may be pulsed on and off at desired pulse repetition rates and mark space ratios for the following purposes (1) measurement of distance and velocity, (2) transmission of data.

In the case of distance and velocity measurement the transceiver does not operate as a true doppler transceiver but as a transmit/receive type radar with a very short range. In the case of data transmission two such transceivers operate as a transmitter/receiver combination (bidirectionally).

It should be evident from the above description that the present invention provides a very simple and therefore inexpensive transceiver module which is not antenna loaded and therefore is very simple to install. The use of a single transistor as an oscillator and amplifier simultaneously considerably reduces component costs and renders the overall cost of the module low enough to make it extremely attractive in many domestic situations such as detection of the presence or approach of a person for sounding an alarm, turning on a light or opening a door, for example.

The modifications achieved by the capacitor $C_b$ and the resistor $R_{b3}$ which effectively cause the transistor to act in a third mode as a doppler frequency amplifier significantly increase the amplitude of the output signal and the sensitivity of the device. The modifications do not cause any degradation in the stability or energy consumption of the device nor do they alter the operation of the radar frequency sections of the device.

I claim:

1. A doppler radar transceiver comprising a transceiving module including a reflex circuit having a single transistor which simultaneously acts as both an oscillator and an amplifier, characterized in that a capacitor and resistor are provided in a base element bias circuit of the transistor to reduce the source impedance of the base current to said transistor in the doppler signal frequency band without affecting a radar frequency system of the transceiver.

2. A doppler radar transceiver as defined in claim 1 wherein a DC biasing circuit for said transistor is arranged such that the base bias current of the transistor is derived from a voltage divider circuit via a receive stripline element, characterized in that said resistor is connected in series with said stripline element and said capacitor is connected in parallel with one of a number of resistors constituting said voltage divider circuit.

3. A doppler radar transceiver as defined in claim 2, characterized in that, the capacitive reactance of said capacitor at a required doppler frequency is less than one tenth the value of said resistor.

4. A doppler radar transceiver as defined in claim 3, characterized in that, a radiating stripline element is connected between the transistor collector terminal and a signal terminal of said transceiver, said radiating stripline element being adapted to emit electromagnetic radiation at a desired frequency.

* * * * *